(12) United States Patent
Kim et al.

(10) Patent No.: US 10,045,012 B2
(45) Date of Patent: Aug. 7, 2018

(54) DISPLAY APPARATUS AND METHOD OF CONTROLLING SCREEN THEREOF

(71) Applicant: SAMSUNG ELECTRONICS CO., LTD., Suwon-si (KR)

(72) Inventors: Ji-gwang Kim, Seoul (KR); Joon-soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 14/805,707

(22) Filed: Jul. 22, 2015

(65) Prior Publication Data

US 2016/0037157 A1 Feb. 4, 2016

(30) Foreign Application Priority Data

Jul. 31, 2014 (KR) ........................ 10-2014-0098582

(51) Int. Cl.
*H04N 13/00* (2018.01)
*H04N 13/04* (2006.01)
(Continued)

(52) U.S. Cl.
CPC ......... *H04N 13/0497* (2013.01); *G09G 3/003* (2013.01); *G09G 5/00* (2013.01); *G09G 5/14* (2013.01); *H04N 13/0422* (2013.01); *H04N 13/0425* (2013.01); *G09G 2320/0261* (2013.01); *G09G 2320/0613* (2013.01); *G09G 2340/0407* (2013.01); *G09G 2340/0464* (2013.01);
(Continued)

(58) Field of Classification Search
CPC ........... H04N 13/0497; H04N 13/0422; H04N 13/0425; G09G 3/003; G09G 5/14; G09G 2320/0261; G09G 2340/0407; G09G 2340/0464; G09G 2340/14; G09G 2354/00
See application file for complete search history.

(56) References Cited

U.S. PATENT DOCUMENTS 7,295,699 B2   11/2007   Ohba et al.
8,109,639 B2    2/2012   Furui et al.
(Continued)

FOREIGN PATENT DOCUMENTS

CN   102842301 A   12/2012
CN   103336647 A   10/2013
(Continued)

OTHER PUBLICATIONS

Communication dated Feb. 3, 2016, issued by the European Patent Office in counterpart European Application No. 15178930.2.
(Continued)

*Primary Examiner* — Huy T Nguyen
(74) *Attorney, Agent, or Firm* — Sughrue Mion, PLLC

(57) ABSTRACT

A display apparatus and a method of controlling a screen thereof are provided. The method includes displaying a rectangular screen including a digital image in a display area, receiving information to modify a shape of the rectangular screen, and modifying and displaying the shape of the rectangular screen based on a coordinate value of a horizontal axis of the display area, and the received information. A height of the modified screen decreases as the height is closer to the coordinate value, and the digital image decreases in size as the digital image is closer to the coordinate value to correspond to the height.

19 Claims, 16 Drawing Sheets

(51) Int. Cl.
*G09G 3/00* (2006.01)
*G09G 5/00* (2006.01)
*G09G 5/14* (2006.01)
*H04N 21/442* (2011.01)

(52) U.S. Cl.
CPC ..... *G09G 2340/14* (2013.01); *G09G 2354/00* (2013.01); *H04N 21/44218* (2013.01)

(56) References Cited

U.S. PATENT DOCUMENTS

| | | | |
|---|---|---|---|
| 9,451,242 | B2 | 9/2016 | Wu et al. |
| 2002/0046100 | A1 | 4/2002 | Kinjo |
| 2007/0052731 | A1 | 3/2007 | Bae |
| 2010/0141897 | A1* | 6/2010 | Kawano ............... G02B 5/189 353/34 |
| 2011/0304769 | A1* | 12/2011 | Kubota ................. G06T 3/40 348/563 |
| 2013/0227457 | A1* | 8/2013 | Kim ..................... G06F 9/4443 715/769 |
| 2014/0055578 | A1* | 2/2014 | Wu ..................... H04N 13/0402 348/51 |
| 2014/0324623 | A1* | 10/2014 | Choi .................. G06Q 30/0631 705/26.7 |
| 2015/0109323 | A1* | 4/2015 | Johnson ................ G09G 5/026 345/594 |

FOREIGN PATENT DOCUMENTS

| | | |
|---|---|---|
| JP | 3548806 B2 | 7/2004 |
| JP | 2009-200683 A | 9/2009 |
| JP | 2012-215660 A | 11/2012 |
| KR | 10-0744516 B1 | 8/2007 |
| KR | 10-1007679 B1 | 1/2011 |
| WO | 2013/125863 A1 | 8/2013 |

OTHER PUBLICATIONS

Communication dated Oct. 8, 2015 by the European Patent Office in related Application No. 15178930.2.

Communication dated Dec. 4, 2017, issued by the Chinese patent office in counterpart Chinese application No. 201510463480.X.

* cited by examiner

FIG. 2
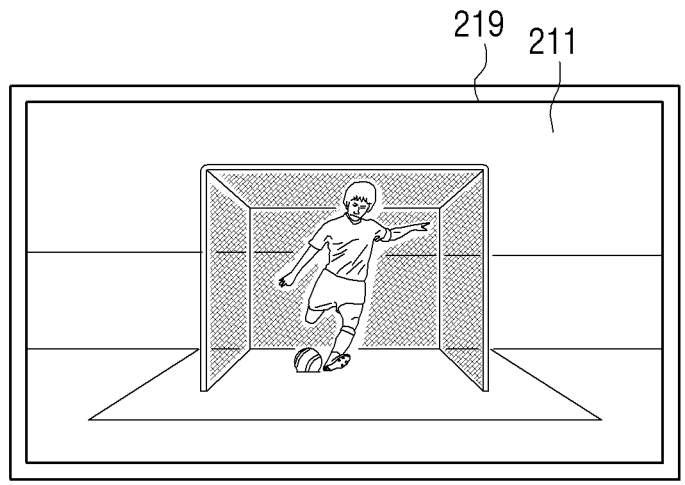
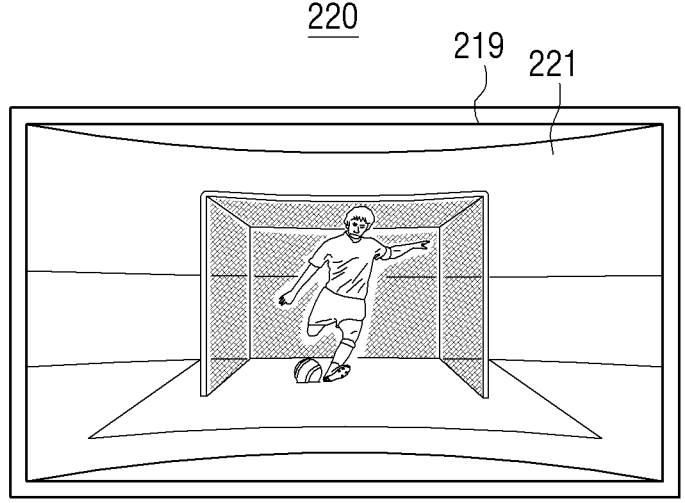

FIG. 11
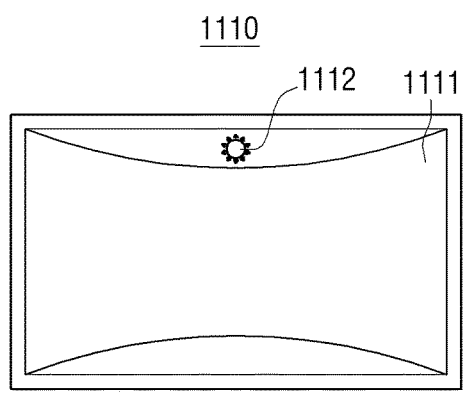
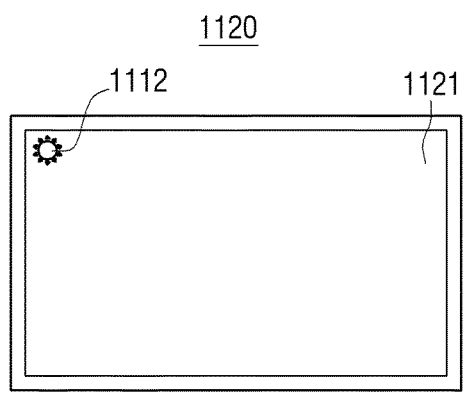
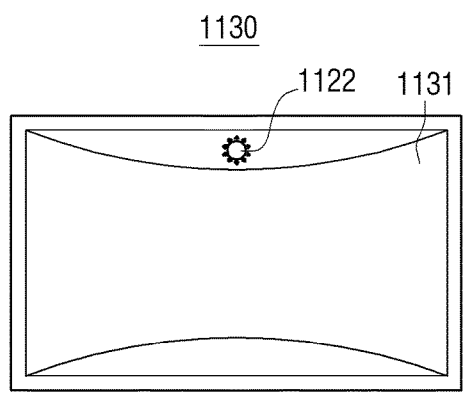

FIG. 12
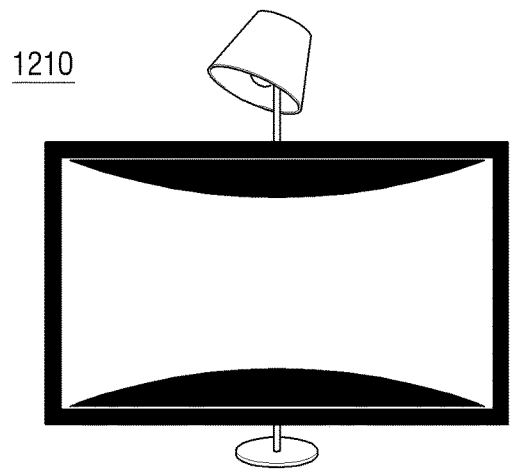
1210
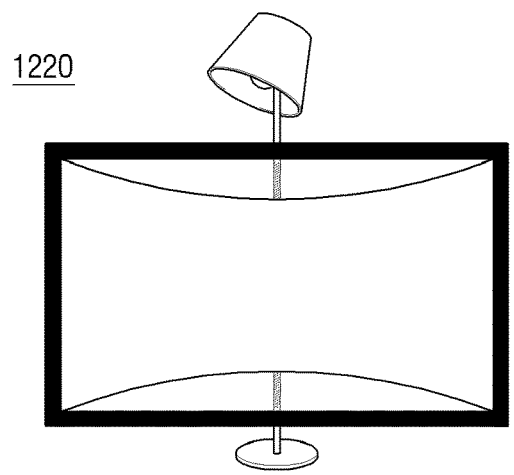
1220
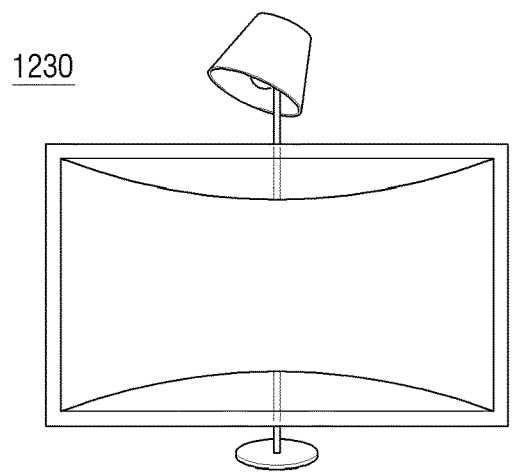
1230

DISPLAY APPARATUS AND METHOD OF CONTROLLING SCREEN THEREOF

CROSS-REFERENCE TO RELATED APPLICATION(S)

This application claims priority under 35 U.S.C. § 119 from Korean Patent Application No. 10-2014-0098582, filed on Jul. 31, 2014, in the Korean Intellectual Property Office, the disclosure of which is incorporated herein by reference in its entirety.

BACKGROUND

1. Field

Apparatuses and methods consistent with exemplary embodiments relate to a display apparatus and a method of controlling a screen thereof.

2. Description of the Related Art

A display apparatus may provide a user with a screen including various types of digital images.

For example, if the display apparatus is a curved TV, the display apparatus may provide the user with a screen including a digital image through a panel that is concavely curved to enable a distance from eyes of the user to a center and both sides of the screen to be constant. In this case, as a 3-dimensional (3D) effect of the digital image is extended, an immersion of the user who views the digital image may increase, and an eye fatigue of the user may decrease.

However, in comparison with a flat screen TV, purchasing cost of the curved TV may be high, and the curved TV may take up much space. Also, the user may feel a distortion phenomenon of the screen according to a position for viewing the curved TV. In particular, as the user is closer to both sides of the display apparatus, the user may further feel the distortion phenomenon of the screen.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide controlling of a shape of a provided screen including a digital image to increase a 3-dimensional (3D) effect of the digital image and an immersion of a user who views the digital image.

One or more exemplary embodiments also provide various controlling of a shape of a screen in consideration of a viewing position of a user or a type of a digital image.

According to an aspect of an exemplary embodiment, there is provided a method of controlling a screen of a display apparatus, the method including displaying a rectangular screen comprising a digital image in a display area, receiving information to modify a shape of the rectangular screen, and modifying and displaying the shape of the rectangular screen based on a coordinate value of a horizontal axis of the display area, and the received information. A height of the modified screen decreases as the height is closer to the coordinate value, and the digital image decreases in size as the digital image is closer to the coordinate value to correspond to the height.

The information to modify the shape of the rectangular screen may include a position of a user who views the digital image.

A horizontal side of the modified screen has a curve shape that is concave toward a center of the display area.

The information to modify the shape of the rectangular screen may include a vertical distance between the display apparatus and a user, a horizontal side of the modified screen may have a curve shape that is concave toward a center of the display area, and a curvature of the curve shape may decrease with an increase in the vertical distance.

The information to modify the shape of the rectangular screen may include a horizontal distance between a point of the display apparatus and the user, and in response to the horizontal distance being greater than or equal to a preset distance, a horizontal side of the modified screen may have a slashed shape.

The information to modify the shape of the rectangular screen may include at least one of a type of a content in the digital image, a motion of a user who views the digital image, a height of the user, and information of a manipulation of a remote controller connected to the display apparatus.

The method may further include displaying additional information in an area of the display area from which the modified screen is excluded.

The method may further include displaying, in a dark color, an area of the display area from which the modified screen is excluded.

The method may further include displaying an external environment image of the display apparatus that corresponds to an area of the display area from which the modified screen is excluded, in the area of the display area from which the modified screen is excluded.

According to an aspect of another exemplary embodiment, there is provided a method of controlling a screen of a display apparatus, the method including displaying a rectangular screen comprising a digital image in a display area, receiving information to modify a shape of the rectangular screen, and modifying and displaying the shape of the rectangular screen based on a coordinate value of a horizontal axis of the display area, and the received information. A height of the modified screen increases as the height is closer to the coordinate value, and the digital image increases in size as the digital image is closer to the coordinate value to correspond to the height.

According to an aspect of another exemplary embodiment, there is provided a display apparatus for controlling a screen, the display apparatus including a display unit configured to display a rectangular screen comprising a digital image in a display area. The display apparatus further includes a controller configured to receive information to modify a shape of the rectangular screen, and control the display unit to modify and display the shape of the rectangular screen based on a coordinate value of a horizontal axis of the display area, and the received information. A height of the modified screen decreases as the height is closer to the coordinate value, and the digital image decreases in size as the digital image is closer to the coordinate value to correspond to the height.

The controller may be further configured to control the display unit to display additional information in an area of the display area from which the modified screen is excluded.

The controller may be further configured to control the display unit to display, in a dark color, an area of the display area from which the modified screen is excluded.

The controller may be further configured to control the display unit to display an external environment image of the display apparatus that corresponds to an area of the display area from which the modified screen is excluded, in the area of the display area from which the modified screen is excluded.

According to an aspect of another exemplary embodiment, there is provided a display apparatus for controlling a screen, the display apparatus including a display unit configured to display a rectangular screen comprising a digital image in a display area. The display apparatus further includes a controller configured to receive information to modify a shape of the rectangular screen, and control the display unit to modify and display the shape of the rectangular screen based on a coordinate value of a horizontal axis of the display area, and the received information. A height of the modified screen increases as the height is closer to the coordinate value, and the digital image increases in size as the digital image is closer to the coordinate value to correspond to the height.

According to an aspect of another exemplary embodiment, there is provided a display apparatus for controlling a screen, the display apparatus including a display unit configured to display a rectangular screen in a display area. The display apparatus further includes a controller configured to receive information to modify a shape of the rectangular screen, and control the display unit to modify the shape of the rectangular screen based on the information and a coordinate value of an axis of the display area, a height of the modified screen changing as the height is closer to the coordinate value.

The information may include a height of a user in front of the display apparatus, and a vertical side of the modified screen may have a slashed shape. In response to the height being less than or equal to a preset distance range, a width of the modified screen may widen as going upwards. In response to the height being greater than or equal to the preset distance range, the width of the modified screen may widen as going downwards.

The information may include a type of a content in the rectangular screen. In response to the type being a content captured at a relatively long distance, a horizontal side of the modified screen has a concave curve shape. In response to the type being a content captured at a relatively short distance, a horizontal side of the modified screen has a convex curve shape.

The information may include a motion of a user in front of the display apparatus. In response to the motion being the user bending a face back, a horizontal side of the modified screen may have a concave curve shape. In response to the motion being the user sticking the face out, a horizontal side of the modified screen may have a convex curve shape.

The information may include a manipulation of a remote controller of the display apparatus. In response to the manipulation being a selection of a screen concave button, a horizontal side of the modified screen may have a concave curve shape. In response to the manipulation being a selection of a screen convex button, a horizontal side of the modified screen may have a convex curve shape.

BRIEF DESCRIPTION OF THE DRAWINGS

The above and/or other aspects will be more apparent by describing certain exemplary embodiments with reference to the accompanying drawings, in which:

FIG. 2 is a view illustrating a process of modifying a shape of a screen according to an exemplary embodiment;

FIG. 11 is a view illustrating additional information that is displayed in an area of a display area from which a modified screen is excluded, according to an exemplary embodiment;

FIG. 12 is a view illustrating a process of controlling of an area of a display area from which a modified screen is excluded, according to an exemplary embodiment;

DETAILED DESCRIPTION OF THE EXEMPLARY EMBODIMENTS

Figure 1:
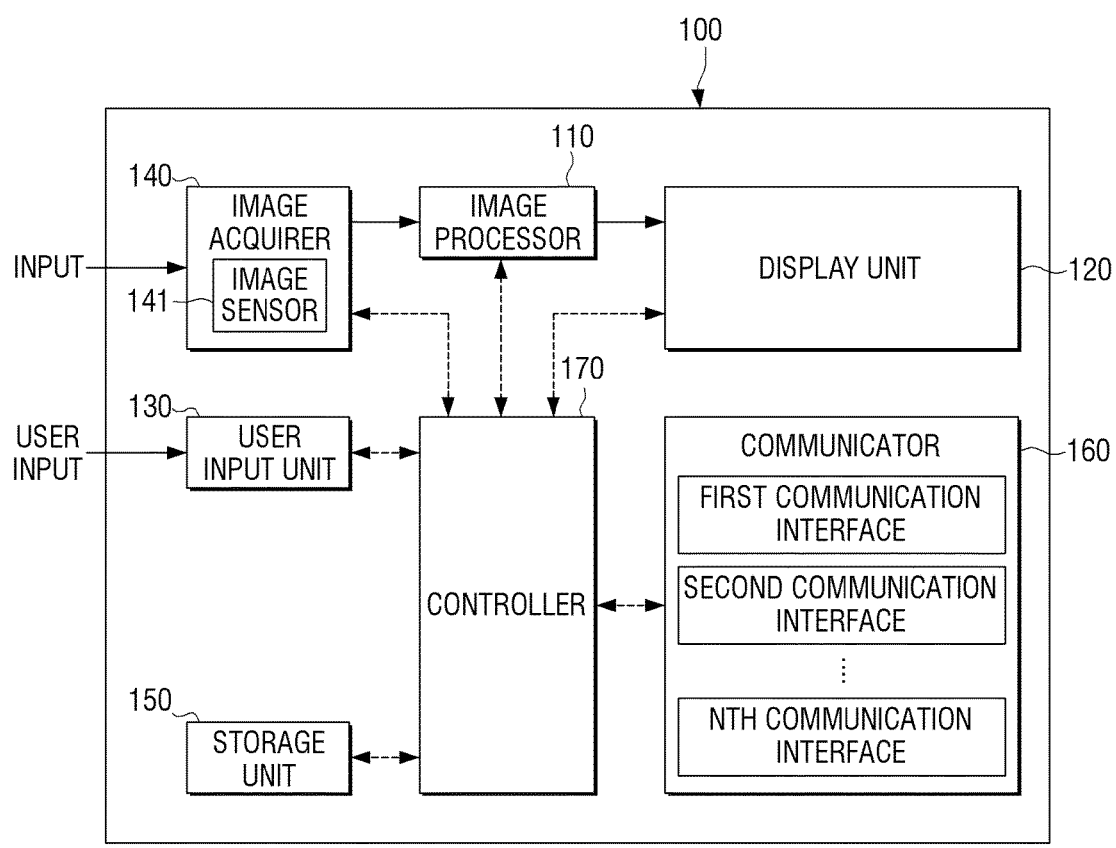
FIG. 1 is a block diagram illustrating a structure of a display apparatus according to an exemplary embodiment.

Exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

It will be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In exemplary embodiments, "module" or "unit" may perform at least one function or operation and may be realized as hardware or software or as a combination of hardware and software. Also, a plurality of "modules" or a plurality of "units" may be integrated into at least one module except "module" or "unit", which needs to be realized as particular hardware, so as to be realized as at least one processor.

FIG. 1 is a block diagram illustrating a structure of a display apparatus 100 according to an exemplary embodiment. Here, the display apparatus 100 may be a digital TV, but this is only an exemplary embodiment. Therefore, the display apparatus 100 may be realized as various types of display apparatuses that may display a digital image, like a smartphone, a tablet PC, a notebook PC, a smart TV, a desktop PC, etc. The display apparatus 100 includes an image processor 110, a display unit 120, a user input unit 130, an image acquirer 140, a storage unit 150, a communicator 160, and a controller 170. The image processor 110 processes an image signal received from an external source, and the display unit 120 displays the image signal processed by the image processor 110 as an image. The user input unit 130 receives an input of a user, and the image acquirer 140 captures an external environment of the display apparatus 100 to acquire an external image. The storage unit 150 stores various types of data, the communicator 160 communicates with an external device by wire or wirelessly, and the controller 170 controls the display apparatus 100.

The image processor 110 may perform various types of preset image processing processes on the image signal. The image processor 110 may output the image signal, on which the image processing processes are performed, to the display unit 120 to display an image in a display area.

For this, the image processor 110 may include an image receiver (not shown) that receives the image signal from the external source. The image processor 110 may be realized in various methods according to a standard of the received image signal and a realization type of the display apparatus 100. For example, the image processor 110 may wirelessly receive a radio frequency (RF) signal from a broadcasting station (not shown), or may receive an image signal, which complies with composite video, component video, super video, SCART, and high definition multimedia interface (HDMI) standards, etc., by wire. If the image signal is a broadcast signal, the image processor 110 may include a tuner that tunes the broadcast signal according to channels.

Also, the image signal may be input from the external device, for example, may be input from an external device such as a PC, an audio-visual (AV) apparatus, a smartphone, a smart pad, and the like. In addition, the image signal may come from data received through a network such as the Internet and the like. In this case, the display apparatus 100 may perform a network communication through the communicator 160. The image signal may come from data stored in the storage unit 150 that is non-volatile like a flash memory, a hard disk, and the like. The storage unit 150 may be installed inside or outside the display apparatus 100. If the storage unit 150 is installed outside the display apparatus 100, the display apparatus 100 may further include a connector (not shown) to which the storage unit 150 is connected.

Types of the image processing processes performed by the image processor 110 are not limited. For example, the image processing processes may include at least one selected from decoding, de-interlacing, frame refresh rate converting, and scaling corresponding to various types of image formats, and a noise reduction, a detail enhancement, and line scanning for enhancing an image quality. The image processor 110 may be realized as an individual structure group that may independently perform each of the image processing processes or as a System-on-Chip (SoC) into which several functions are integrated.

The display unit 120 displays an image based on the image signal processed by the image processor 110. A realization method of the display unit 120 is not limited, for example, the display unit 120 may be realized as various types of display types such as a liquid crystal, plasma, a light-emitting diode (LED), an organic LED (OLED), a surface-conduction electron-emitter, a carbon nano-tube, a nao-crystal, etc.

The display unit 120 may additionally include an additional structure according to a realization method thereof. For example, if the display unit 120 is realized as the liquid crystal, the display unit 120 may include a liquid crystal display (LCD) panel (not shown), a backlight unit (not shown) that supplies light to the LCD panel, and a panel driving substrate (not shown) that drives the LCD panel.

The display unit 120 may include a touch screen (not shown) that receives an input coming from a touch of a user. For example, the touch screen may be realized as a resistive type, a capacitive type, an infrared type, or an acoustic wave type.

Communication interface information that is supported by the communicator 160 may be displayed in a display area according to an exemplary embodiment. The controller 170 may control the display unit 120 to display the communication interface information stored in the storage unit 150 in the display area.

The user input unit 130 may transmit various types of preset control commands or unlimited information to the controller 170 through a manipulation and an input of the user.

According to an exemplary embodiment, the user input unit 130 may be installed in a main body of the display apparatus 100, or may receive an input signal from an input device that is separated from the display apparatus 100. For example, the user input unit 130 may receive an input signal through a keypad (or an input panel) (not shown) including buttons such as a number key, a menu key, etc. that are provided in the main body of the display apparatus 100. Alternatively, the user input unit 130 may receive an input signal through a separated input device, such as a remote controller, a keyboard, a mouse, or the like, which generates a preset command/data/information/signal and transmits the preset command/data/information/signal to the display apparatus 100 so as to enable a TV to be remotely controlled. Here, the separated input device is an external device that is connected to the main body of the display apparatus 100 to perform a wireless communication, and the wireless communication may include an infrared communication, an RF communication, a wireless local area network (WLAN), etc. The input device may be manipulated by the user to transmit a preset command to the display apparatus 100.

The image acquirer 140 may be realized as a camera that captures an external environment. In this case, the camera may be installed in a preset position of the display apparatus 100, e.g., at an upper part of the display apparatus 100, but the installation position of the camera is not limited. Therefore, the camera may be installed outside so as to be separated from the main body of the display apparatus 100.

The image acquirer 140 may include a lens through which an image penetrates, and an image sensor 141 which senses the image penetrating the lens. The image sensor 141 may be realized as a charge-coupled device (CCD) image sensor or a complementary metal-oxide semiconductor (CMOS) image sensor. The image that is input through the image acquirer 140 may be processed by the image processor 110.

The storage unit 150 may store unlimited data under control of the controller 170. The storage unit 150 may include a non-volatile memory, a volatile memory, a flash memory, a hard disc drive (HDD), and/or a solid state drive (SSD). The storage unit 150 may be accessed by the controller 170, and reading/writing/revising/deleting/updating of data may be performed by the controller 170.

The data stored in the storage unit 150 may include an operating system (O/S) for driving the display apparatus 100, and various types of applications, image data, additional data, etc. that may be executed on the O/S.

In detail, the storage unit 150 may store a signal or data that is input/output so as to correspond to operations of elements under control of the controller 170. The storage unit 150 may store a graphical user interface (GUI) of a control program for controlling the display apparatus 100 and an application provided from a manufacturer or downloaded from an external source, images, user information, documents, databases (DBs) for providing the GUI, or pieces of related data.

In the exemplary embodiment, the term "storage unit" may include the storage unit 150, a read only memory (ROM) (not shown) or a random access memory (RAM) (not shown) of the controller 170, and/or a memory card (not shown) (e.g., a micro secure digital (SD) card, a memory stick, or the like) installed in the display apparatus 100.

The communicator 160 communicates with other devices. The communicator 160 may support at least one selected from first through $N^{th}$ communication interfaces such as WiFi, Bluetooth, RF, Zigbee, WLAN, an infrared communication, a ultra wideband (UWB), a near field communication (NFC), etc.

According to an exemplary embodiment, the communicator 160 may be installed in the main body of the display apparatus 100, or may be realized as a dongle or module type to be attached into or detached from a connector (not shown) of the display apparatus 100.

The controller 170 may perform control operations with respect to various types of elements of the display apparatus 100. For example, the controller 170 may perform control operations, etc. corresponding to the image processing processes performed by the image processor 110 and the input signal received by the user input unit 130 to control an overall operation of the display apparatus 100. For example, the controller 170 may be realized as a type where software is combined with a central processing unit (CPU).

The controller 170 may control an overall operation of the display apparatus 100 and a signal flow between internal elements 110 through 160 of the display apparatus 100, and process data. The controller 170 may control a supply of power from a power supply unit (not shown) to the internal elements 110 through 160. Also, if the controller 170 meets an input of the user or preset and stored conditions, the controller 170 may execute the O/S and various types of applications stored in the storage unit 150.

Also, if a rectangular screen including a digital image is displayed in a display area, the controller 170 may control the display unit 120 or the display apparatus 100 to acquire information to modify a shape of the rectangular screen, and modify and display the shape of the rectangular screen based on one coordinate value of a horizontal axis of the display area in consideration of the acquired information. Here, as a height of the modified screen is closer to the one coordinate value, the height of the modified screen may decrease. Also, as the digital image is closer to the one coordinate value, to correspond to the height of the modified screen, the digital image may shrink or decrease in size.

According to another exemplary embodiment, if a rectangular screen including a digital image is displayed in a display area, the controller 170 may control the display unit 120 or the display apparatus 100 to acquire information to modify a shape of the rectangular screen, and modify and display the shape of the rectangular screen based on one coordinate value of a horizontal axis of the display area in consideration of the acquired information. Here, as a height of the modified screen is closer to one coordinate value, the height of the modified screen may increase. Also, as the digital image is closer to the one coordinate value, to correspond to the height of the modified screen, the digital image may enlarge or increase in size.

According to another exemplary embodiment, if a rectangular screen including a digital image is displayed in a display area, the controller 170 may control the display unit 120 or the display apparatus 100 to acquire information to modify a shape of the rectangular screen, modify and display a shape of the rectangular screen based on one coordinate value of a vertical axis of the display area in consideration of the acquired information. Here, as a width of the modified screen is closer to the one coordinate value, the width of the modified screen may widen. Also, as the digital image is closer to the one coordinate value, to correspond to the width of the modified rectangular screen, the digital image may enlarge or increase in size.

Accordingly to another exemplary embodiment, if a rectangular screen including a digital image is displayed in a display area, the controller 170 may control the display unit 120 or the display apparatus 100 to acquire information to modify a shape of the rectangular screen, and modify and display a shape of the rectangular screen based on one coordinate value of a vertical axis of the display area in consideration of the acquired information. Here, as a width of the modified screen is closer to the one coordinate value, the width of the modified screen may narrow. Also, as the digital image is closer to the one coordinate value, to correspond to the width of the modified screen, the digital image may shrink or decrease in size.

Various exemplary embodiments for controlling a screen of the display apparatus 100 of FIG. 1 will now be described with reference to FIGS. 2 through 11.

FIG. 2 is a view illustrating a process of modifying a shape of a screen according to an exemplary embodiment.

Referring to a portion 210 of FIG. 2, the display unit 120 displays a rectangular screen 211 including a digital image in a display area 219. Here, the display area 219 may refer to an area corresponding to a display panel that may display an image.

When the rectangular screen 211 is displayed, the controller 170 controls the display unit 120 or the display apparatus 100 to acquire information for modifying a shape of the rectangular screen 211, and modifies and displays the shape of the rectangular screen 211 in consideration of the acquired information. Here, the information for modifying the shape of the rectangular screen 211 may be user position information or information about a content type included in the digital image. For example, the user position information may include a vertical distance from the display area 219 to a user, a horizontal distance from a center of the display area 219 to the user, a height of the user, and the like. Also, the information about the content type may include information indicating whether a content is captured at a long distance or a short distance.

Referring to a portion 220 of FIG. 2, the display unit 120 displays a modified screen 221 in the display area 219.

Figure 3:
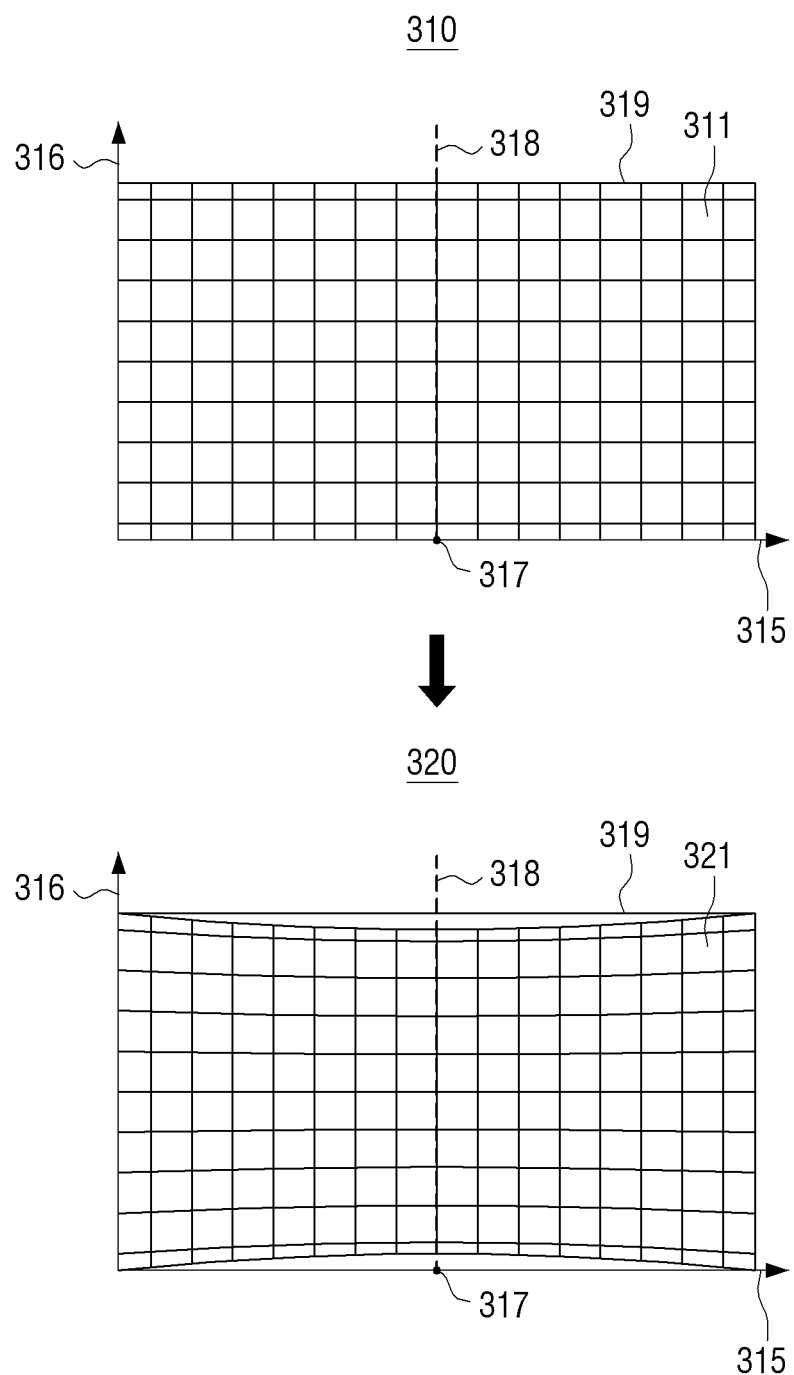
FIG. 3 is a view illustrating a process of modifying a shape of a screen according to another exemplary embodiment.

FIG. 3 is a view illustrating a process of modifying a shape of a screen according to another exemplary embodiment.

Referring to a portion 310 of FIG. 3, the display unit 120 displays a screen 311 including a digital image in a display area 319. Here, the display area 319 is positioned on a horizontal axis 315 and a vertical axis 316. In this case, the controller 170 acquires information for modifying a shape of the screen 311. Also, the controller 170 determines one coordinate value 317 of the horizontal axis 315 in consideration of the acquired information. The controller 170 controls the display unit 120 to modify and display the shape of the screen 311 based on the one coordinate value 317. For example, the controller 170 may control the display unit 120 to modify and display the shape of the screen 311 based on a vertical axis 318 of the one coordinate value 317.

Referring to a portion 320 of FIG. 3, the display unit 120 displays a modified screen 321 in the display area 319. Here, as a height of the modified screen 321 is closer to the one coordinate value 317, the height of the modified screen 321 gradually decreases. Therefore, the modified screen 321 has the lowest height at the one coordinate value 317. In other words, at least one of horizontal sides of the modified screen 321 has a curve shape that is concave toward a center of the display area 319. Also, as a digital image included in the modified screen 321 is closer to the one coordinate value 317, to correspond to the height of the modified screen 321, the digital image gradually shrinks. In addition, the digital image may be displayed to be clearest in the center of the display area 319 and to blur as a distance from the center of a screen of the display area 319 increases.

As described above, as a 3-dimensional (3D) effect of the digital image increases through the modified screen 321 and a modified digital image, an immersion of a user who views the digital image may increase.

Figure 4:
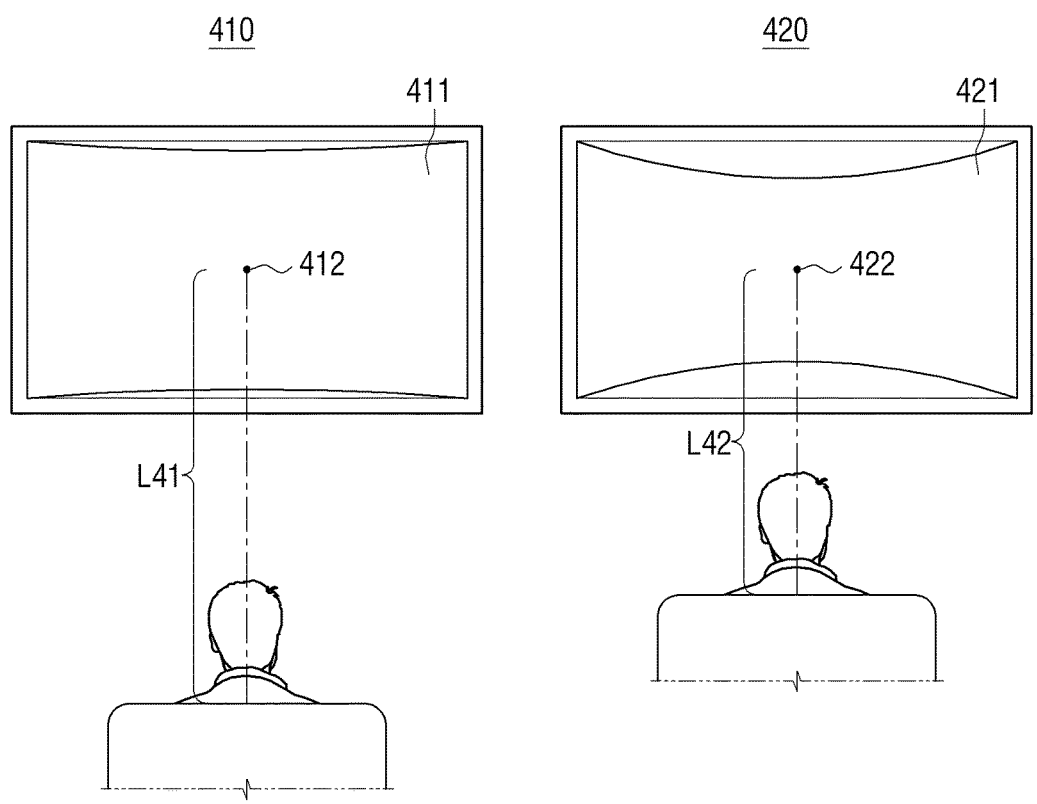
FIG. 4 is a view illustrating a shape of a screen that is modified in consideration of a position of a user, according to an exemplary embodiment.

FIG. 4 is a view illustrating a shape of a screen that is modified in consideration of a position of a user, according to an exemplary embodiment.

The controller 170 may control the display unit 120 or the display apparatus 100 to acquire vertical distance information from a display area to the user as information for modifying the shape of the screen, and modify and display the shape of the screen in consideration of the acquired vertical distance information.

Referring to a portion 410 of FIG. 4, if a vertical distance L41 from a point 412 of the display area to the user is within a preset distance range, the controller 170 controls the display unit 120 to display a modified screen 411 having horizontal sides having concave curve shapes. Here, the vertical distance L41 may be a distance between a center of the display area and the user.

Also, referring to a portion 420 of FIG. 4, if a vertical distance L42 from a point 422 of the display area to the user is shorter than the preset distance range, the controller 170 controls the display unit 120 to display a modified screen 421 having horizontal sides having concave curve shapes with increased curvatures in consideration of the vertical distance L42. Here, the vertical distance L42 may be a distance between the center of the display area and the user.

As described above, as a vertical distance from a display area to a user decreases, curvatures of horizontal sides of a modified screen may gradually increase. As the vertical distance from the display area to the user increases, the curvatures of the horizontal sides of the modified screen may decrease.

Figure 5:
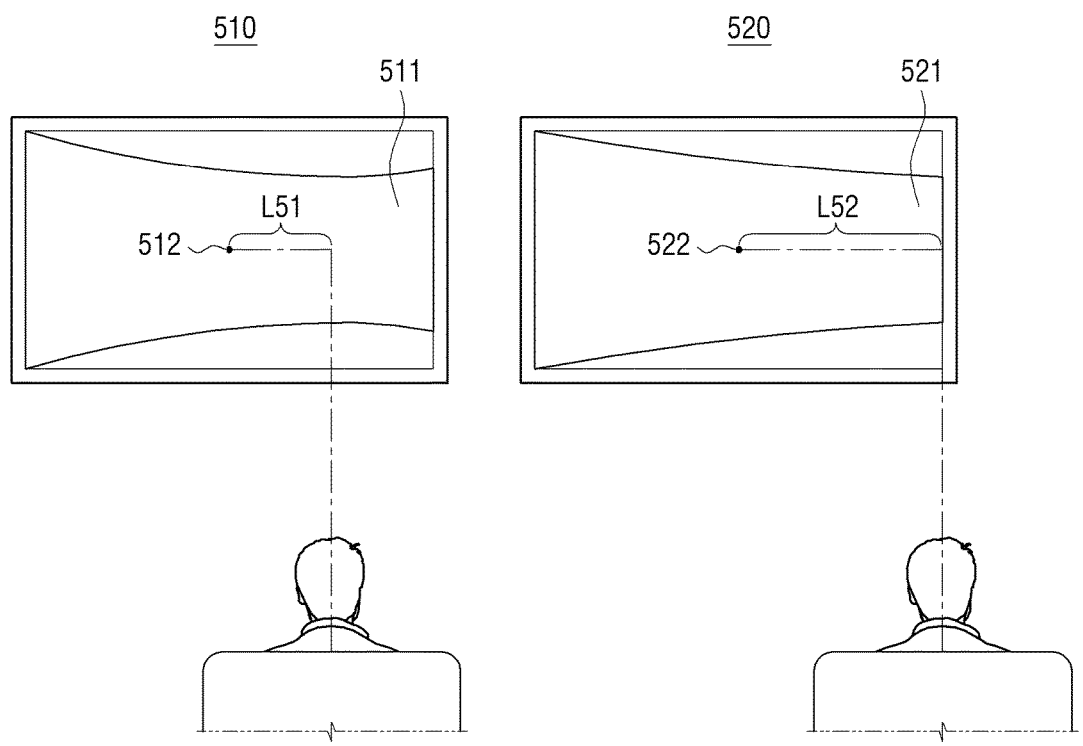
FIG. 5 is a view illustrating a shape of a screen that is modified in consideration of a position of a user, according to another exemplary embodiment.

FIG. 5 is a view illustrating a shape of a screen that is modified in consideration of a position of a user, according to another exemplary embodiment.

The controller 170 may control the display unit 120 or the display apparatus 100 to acquire horizontal distance information from a display area to the user as information for modifying the shape of the screen, and modify and display the shape of the screen in consideration of the acquired horizontal distance information.

Referring to a portion 510 of FIG. 5, if a horizontal distance L51 from a point 512 of the display area (e.g., a center of the display area or a vertical axis passing the center of the display area) to the user is within a preset distance range to the right, the controller 170 controls the display unit 120 to display a modified screen 511 having horizontal sides having concave curve shapes. Here, the controller 170 may determine one coordinate value of the display area (e.g., a coordinate value of a coordinate perpendicular to the user among coordinates forming the vertical axis passing the center of the display area) in consideration of the horizontal distance L51. The controller 170 may also control the display unit 120 to display the modified screen 511 that has the lowest height at the one coordinate value. In this case, a curvature of a horizontal side positioned on a right side of the one coordinate value may be different from a curvature of a horizontal side positioned on a left side of the one coordinate value.

Referring to a portion 520 of FIG. 5, if a horizontal distance L52 from a point 522 of the display area to the user is longer than or equal to the preset distance range to the right, for example, if the user is positioned to be close to a right side of the display area, the controller 170 controls the display unit 120 to display a modified screen 521 having horizontal sides having slashed shapes. Here, a height of the modified screen 521 gradually increases toward a left side.

Figure 6:
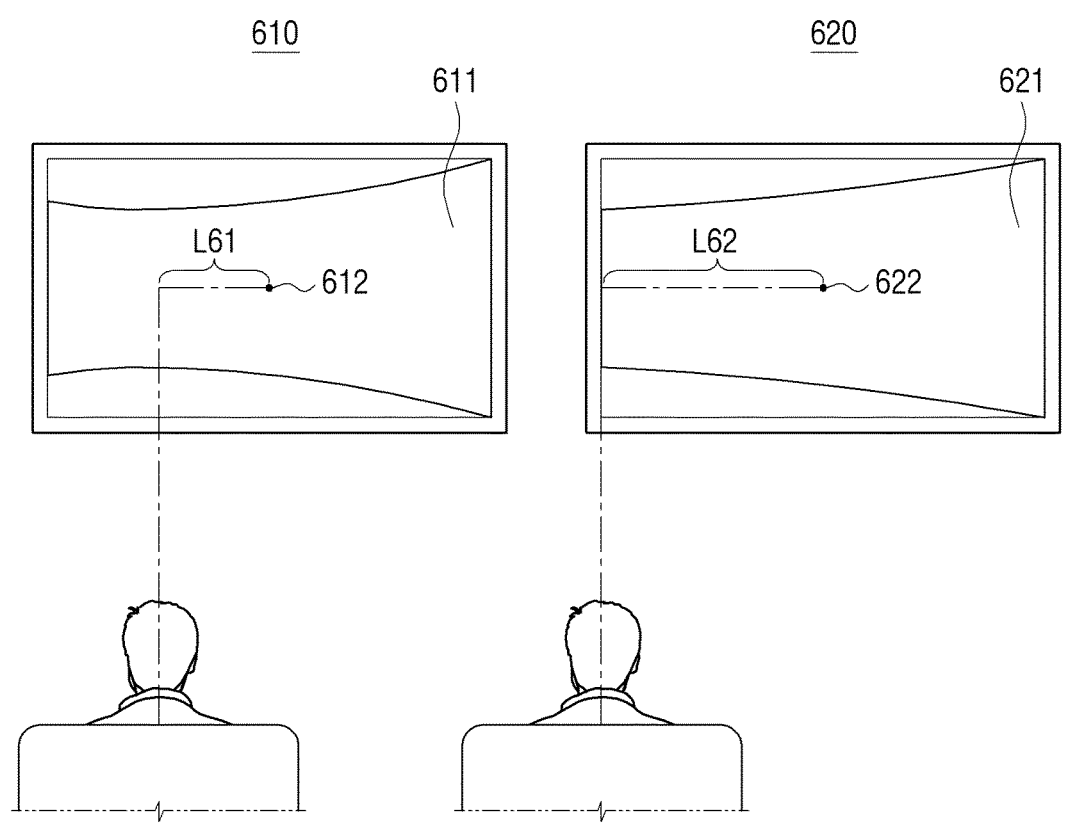
FIG. 6 is a view illustrating a shape of a screen that is modified in consideration of a position of a user, according to another exemplary embodiment.

FIG. 6 is a view illustrating a view illustrating a shape of a screen that is modified in consideration of a position of a user, according to another exemplary embodiment.

Referring to a portion 610 of FIG. 6, if a horizontal distance L61 from a point 612 of a display area to the user is within a preset distance range to the left, the controller 170 controls the display unit 120 to display a modified screen 611 having horizontal sides having concave curve shapes in consideration of the horizontal distance L61. Here, the controller 170 may determine one coordinate value of the display area (e.g., a coordinate value of a coordinate perpendicular to the user among coordinates forming a vertical axis passing a center of the display area) in consideration of the horizontal distance L61. The controller 170 may also control the display unit 120 to display the modified screen 611 having the lowest height at the one coordinate value.

Referring to a portion 620 of FIG. 6, if a horizontal distance L62 from a point 622 of the display area to the user is longer than or equal to the preset distance range to the left, for example, if the user is positioned to be close to a left side of the display area, the controller 170 controls the display unit 120 to display a modified screen 621 having horizontal sides having slashed shapes. Here, a height of the modified screen 621 gradually increases toward a right side.

Figure 7:
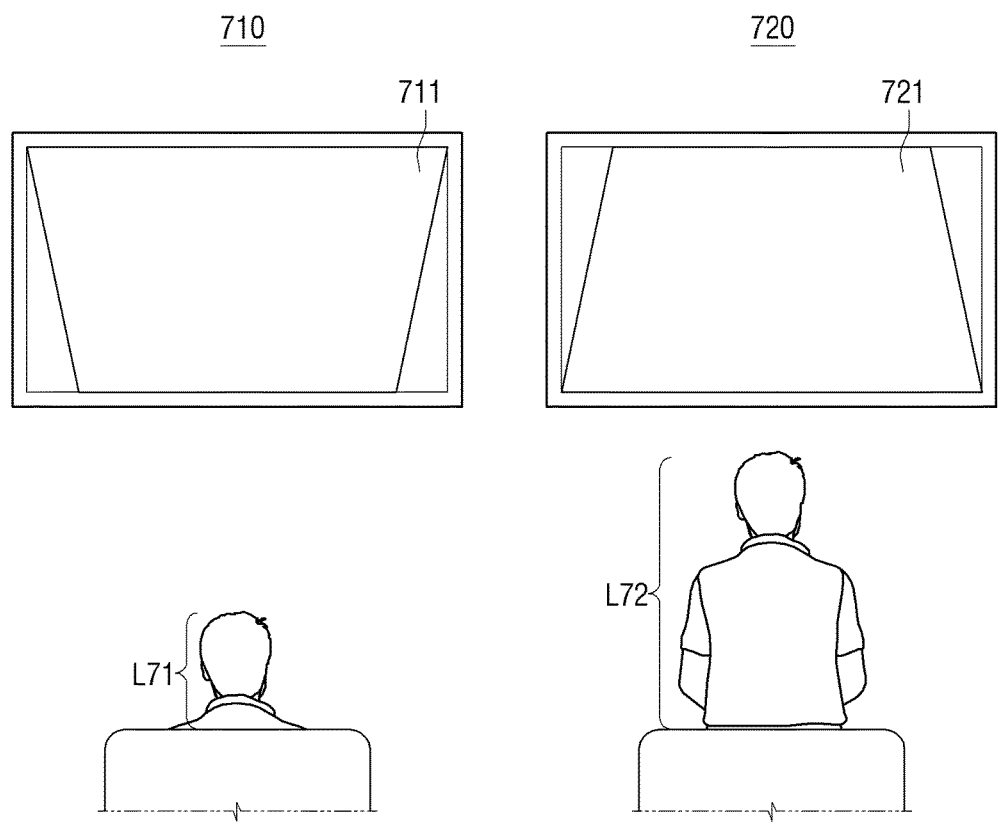
FIG. 7 is a view illustrating a shape of a screen that is modified in consideration of a height of a user, according to an exemplary embodiment.

FIG. 7 is a view illustrating a shape of a screen that is modified in consideration of a height of a user.

The controller 170 may control the display unit 120 or the display apparatus 100 to acquire height information of the user who views a digital image, as information for modifying the shape of the screen, and modify and display the shape of the screen in consideration of the acquired height information of the user.

Referring to a portion 710 of FIG. 7, if a height L71 of the user who is positioned in front of a display area is shorter than or equal to a preset distance range, the controller 170 controls the display unit 120 to display a modified screen 711 having vertical sides having slashed shapes in consideration of the height L71 of the user. Here, a width of the modified screen 711 gradually widens as going upwards.

Referring to a portion 720 of FIG. 7, if a height L72 of the user who is positioned in front of a screen of the display unit 120 is longer than or equal to the preset distance range, the controller 170 controls the display unit 120 to display a modified screen 721 having vertical sides having slashed shapes in consideration of the height L72 of the user. Here, a width of the modified screen 721 gradually widens as going downward.

Figure 8:
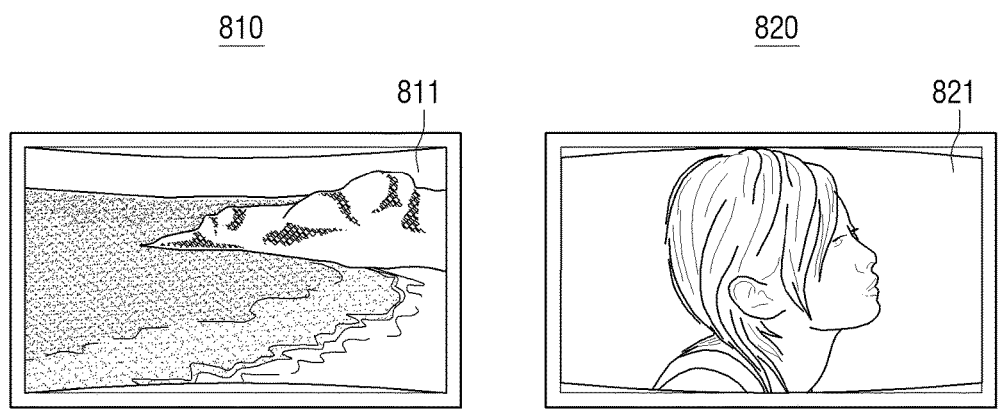
FIG. 8 is a view illustrating a shape of a screen that is modified in consideration of a type of a content, according to an exemplary embodiment.

FIG. 8 is a view illustrating a shape of a screen that is modified in consideration of a type of a content, according to an exemplary embodiment.

The controller 170 may control the display unit 120 or the display apparatus 100 to acquire information about a type of a content included in a digital image as information for modifying the shape of the screen, and modify and display the shape of the screen in consideration of the acquired information. In this case, the information about the type of the content may be acquired from metadata of the content included in the digital image.

Referring to a portion 810 of FIG. 8, if a digital image that is provided through a display area includes a content (e.g., a scenery content) captured at a long distance, the controller 170 controls the display unit 120 to display a modified screen 811 having horizontal sides having concave curve shapes.

Referring to a portion 820 of FIG. 8, if a digital image that is provided through a display area includes a content (e.g., a person close-up content) captured at a short distance, the controller 170 controls the display unit 120 to display a modified screen 821 having horizontal sides having convex curve shapes.

According to another exemplary embodiment, if a digital image includes a background-focused content such as a movie or the like, the controller 170 may control the display unit 120 to display a modified screen having horizontal sides having concave curve shapes. Also, if the digital image includes a person-focused content such as sports, an action, or the like, the controller 170 may control the display unit 120 to display a modified screen having horizontal sides having convex curve shapes.

Figure 9:
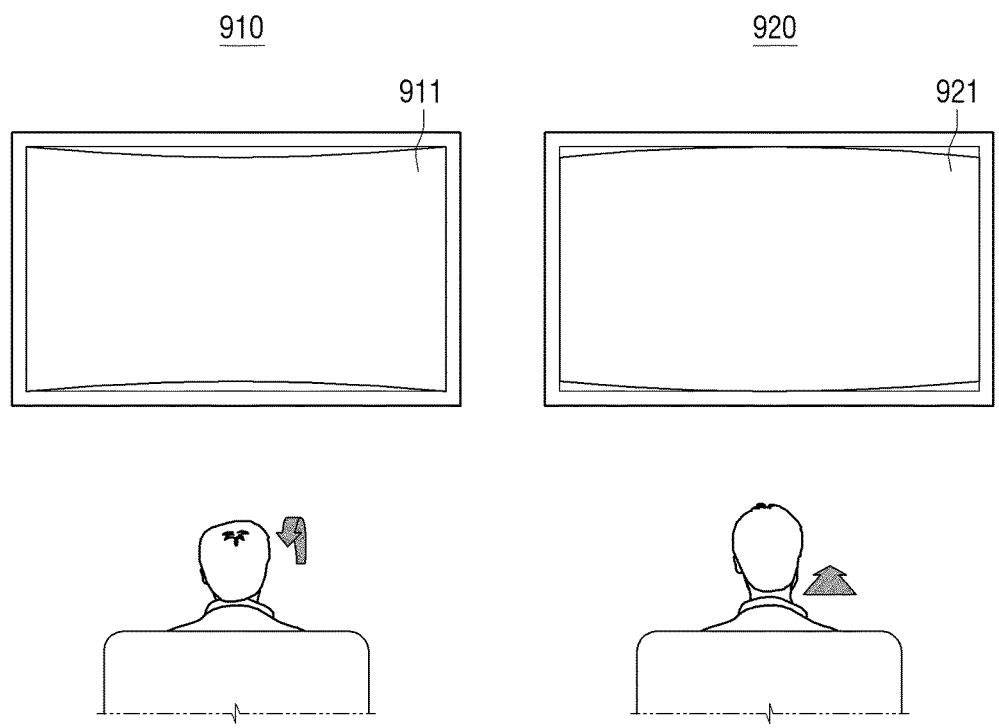
FIG. 9 is a view illustrating a shape of a screen that is modified in consideration of motion information of a user, according to an exemplary embodiment.

FIG. 9 is a view illustrating a shape of a screen that is modified in consideration of motion information of a user, according to an exemplary embodiment.

The controller 170 may control the display unit 120 or the display apparatus 100 to acquire motion information of the user as information for modifying a shape of a screen, and modify and display the shape of the screen in consideration of the acquired information. Here, the controller 170 may analyze a user motion captured by the image acquirer 140 to acquire the motion information of the user.

Referring to a portion 910 of FIG. 9, if the motion information of the user is information indicating that the user bends a face back, the controller 170 controls the display unit 120 to display a modified screen 911 having horizontal sides having concave curve shapes.

Referring to a portion 920 of FIG. 9, if the motion information of the user is information indicating that the user sticks the face out, the controller 170 controls the display unit 120 to display a modified screen 921 having horizontal sides having convex curve shapes.

Figure 10:
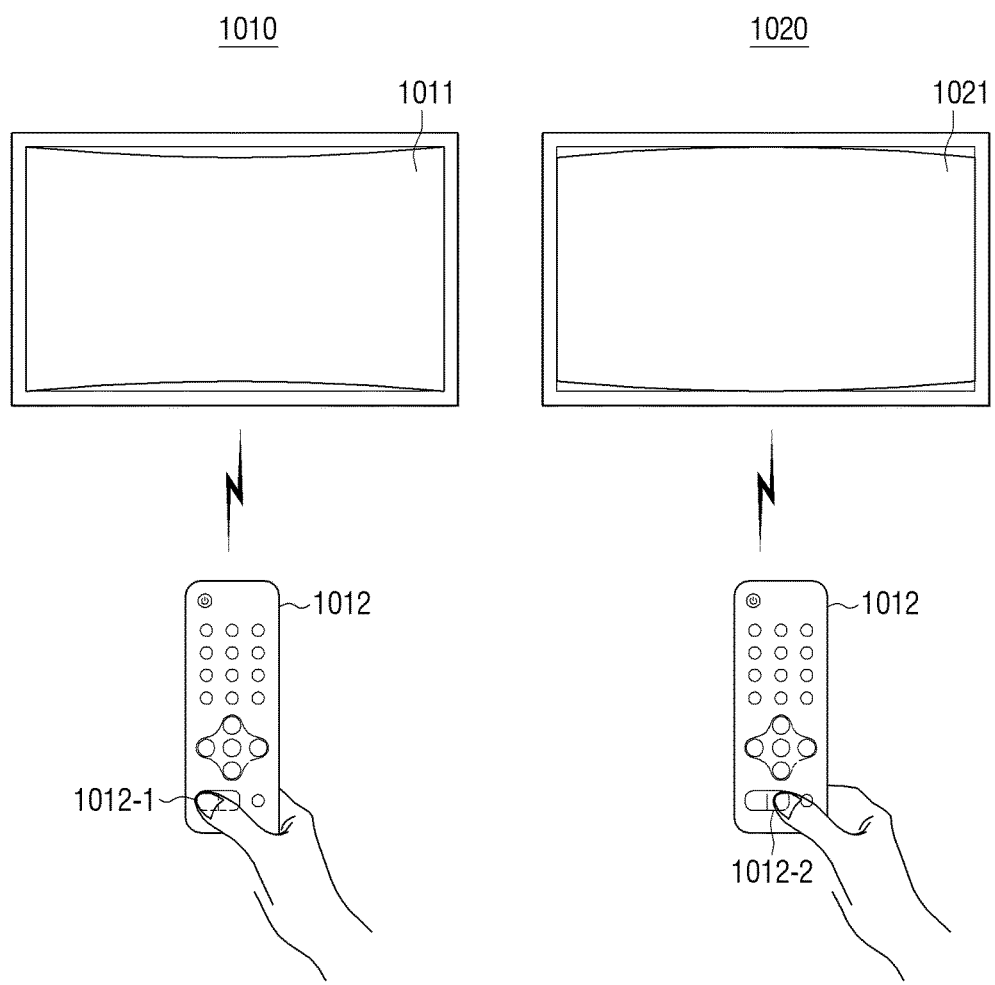
FIG. 10 is a view illustrating a shape of a screen that is modified in consideration of information of a manipulation of a remote controller, according to an exemplary embodiment.

FIG. 10 is a view illustrating a shape of a screen that is modified in consideration of information of a manipulation of a remote controller, according to an exemplary embodiment.

The controller 170 may control the display unit 120 or the display apparatus 100 to acquire information of a manipulation of a remote controller through the user input unit 130, and modify and display the shape of the screen in consideration of the acquired information. Here, the information of the manipulation of the remote controller may be an output signal of the remote controller that is generated in response to a manipulation of the remote controller by a user who selects a button or a menu of the remote controller to modify the screen that is currently displayed.

Referring to a portion 1010 of FIG. 10, if the information of the manipulation of the remote controller is an output signal corresponding to a manipulation of the remote controller by the user who selects a screen concave button 1012-1 of the remote controller, the controller 170 controls the display unit 120 to display a modified screen 1011 having horizontal sides having concave curve shapes. In this case, curvatures of the concave curve shapes of the modified screen 1011 may sequentially increase and decrease according to a manipulation of the remote controller by the user who continuously selects the screen concave button 1012-1 of the remote controller.

Referring to a portion 1020 of FIG. 10, if the information of the manipulation of the remote controller is an output signal corresponding to a manipulation of the remote controller by the user who selects a screen convex button 1012-2 of the remote controller, the controller 170 controls the display unit 120 to display a modified screen 1021 having horizontal sides having convex curve shapes. In this case, curvatures of the convex curve shapes of the modified screen 1021 may sequentially increase and decrease according to a manipulation of the remote controller by the user who continuously selects the screen convex button 1012-2 of the remote controller.

FIG. 11 is a view illustrating additional information that is displayed in an area of a display area, from which a modified screen is excluded, according to an exemplary embodiment.

Referring to a portion 1110 of FIG. 11, the controller 170 controls the display unit 120 to display additional information 1112 in an area of a display area from which a modified screen 1111 is excluded. Here, the additional information 1112 may include, for example, external information such as widgets, an electronic program guide (EPG), etc., and internal information such as an On Screen Display (OSD). For example, the widgets may include weather information, stock information, news information, and the like.

According to another exemplary embodiment, referring to a portion 1120 of FIG. 11, the display unit 120 displays a rectangular screen 1121 including a digital image in a display area. Here, if there is a request for displaying the additional information 1112, the display unit 120 displays the additional information 1112 in the rectangular screen 1121. In this case, a part of the digital image is covered with the additional information 1112.

Referring to a portion 1130 of FIG. 11, if information for modifying a screen is acquired, the controller 170 controls the display unit 120 to display a modified screen 1131, changes a display position of additional information 1122 in consideration of a shape of the modified screen 1131, and display the additional information 1122 in the changed display position. For example, the controller 170 controls the display unit 120 to display the additional information 1122 in an area of the display area from which the modified screen 1131 is excluded. In this case, since a digital image is not covered with the additional information 1122, the user may view the digital image without being disturbed by the additional information 1122.

FIG. 12 is a view illustrating a process of controlling of an area of a display area from which a modified screen is excluded, according to an exemplary embodiment.

If a modified screen is displayed, the controller 170 may determine at least one selected from a color value, a brightness value, and a chroma value of an area of a display area from which the modified screen is excluded. The controller 170 may also control the display unit 120 to display the area based on the determined value.

Referring to a portion 1210 of FIG. 12, the controller 170 may control the display unit 120 to display an area of a display area from which a modified screen is excluded, based on at least one selected from a color value, a brightness value, and a chroma value of a bezel of the display apparatus 100. For example, the controller 170 may control the display unit 120 to display the area of the display area from which a modified screen is excluded, based on a color value equal or similar to a color of the bezel of the display apparatus 100. In detail, if the color of the bezel of the display apparatus 100 is a black color, the controller 170 may control the display unit 120 to display the area of the display area from which the modified screen is excluded, in the black color or a color similar to the black color.

According to another exemplary embodiment, the controller 170 may control the display unit 120 to display the area of the display area from which the modified screen is excluded, based on at least one selected from a color value, a brightness value, and a chroma value that is preset regardless of information of the bezel of the display apparatus 100. For example, the controller 170 may control the display unit 120 to display the area of the display area from which the modified screen is excluded, in a dark color that is preset. Here, the dark color may be a color having a low brightness value (e.g., a value between 0 and 4 if brightness is divided into 10 gray scales from black (0) to white (1)).

According to another exemplary embodiment, the controller 170 may control the display unit 120 to display an external environment of the display apparatus 100 corresponding to an area of a display area from which a modified screen is excluded, in the area.

Referring to a portion 1220 of FIG. 12, the controller 170 may control the display unit 120 to display an area of a display area from which a modified screen is excluded, based on at least one selected from a color value, a brightness value, and a chroma value of an external environment of the display apparatus 100. For example, the controller 170 may acquire an external environment image by using the image acquirer 140 that captures the external environment of the display apparatus 100. The controller 170 may also control the display unit 120 to display the area of the display area from which the modified screen is excluded, based on a value equal or similar to at least one selected from a color value, a brightness value, and a chroma value of the acquired external environment image. In detail, the controller 170 may control the display unit 120 or the display apparatus 100 to acquire a back external environment image of the display apparatus 100, select an external environment image corresponding to an area of the back acquired external environment image from which the modified screen is excluded, and display the selected external environment image in the area. In other words, the controller 170 may control the display unit 120 to display the area of the back external environment image from which the modified screen is excluded, so as to enable the area to be transparently shown to the user. As described above, only a modified screen may be provided through the display unit 120 so as to further increase an immersion of a user who views a digital image.

According to another exemplary embodiment, referring to a portion 1230 of FIG. 12, at least a part of the display apparatus 100 may be formed of a transparent material. For example, the bezel, a circuit board, and the like of the display apparatus 100 may be formed of a transparent material. Alternatively, the display apparatus 100 may not include the bezel. Therefore, if a display area does not include a screen including a digital image or if the display apparatus 100 is turned off, the display area may be transparently shown to a user. In other words, the user may watch a back external environment of the display apparatus 100 through the display area. In detail, if the controller 170 controls the display unit 120 to display a modified screen, an area of the back external environment from which the modified screen is excluded, may be transparently shown to the user. Therefore, an immersion of the user who views the digital image may further increase.

According to an exemplary embodiment, if there are several users who view a digital image, the controller 170 may control the display unit 120 or the display apparatus 100 to acquire position information of a particular user among the several users, and display a modified screen in consideration of the acquired position information. For example, the controller 170 may determine the particular user in consideration of a position and a motion of at least one of the several users or a manipulation state of a remote controller.

For example, the controller 170 may determine one of the several users, who first manipulates the remote controller, as the particular user. The user who first manipulates the remote controller may be a user who turns on the display apparatus 100 by using the remote controller. Alternatively, the user who first manipulates the remote controller may be a user who first manipulates the remote controller after a preset time (e.g., 1 hour or 2 hours) elapses when the remote controller is not manipulated.

According to another exemplary embodiment, the controller 170 may determine one of the several users, who lastly manipulates the remote controller, as the particular user. According to another exemplary embodiment, the controller 170 may respectively measure distances of the several users from the display area to determine one of the several users, who is closest to the display area, as the particular user. According to another exemplary embodiment, the controller 170 may determine one of the several users, who makes a standing motion, as the particular user.

Figure 13:
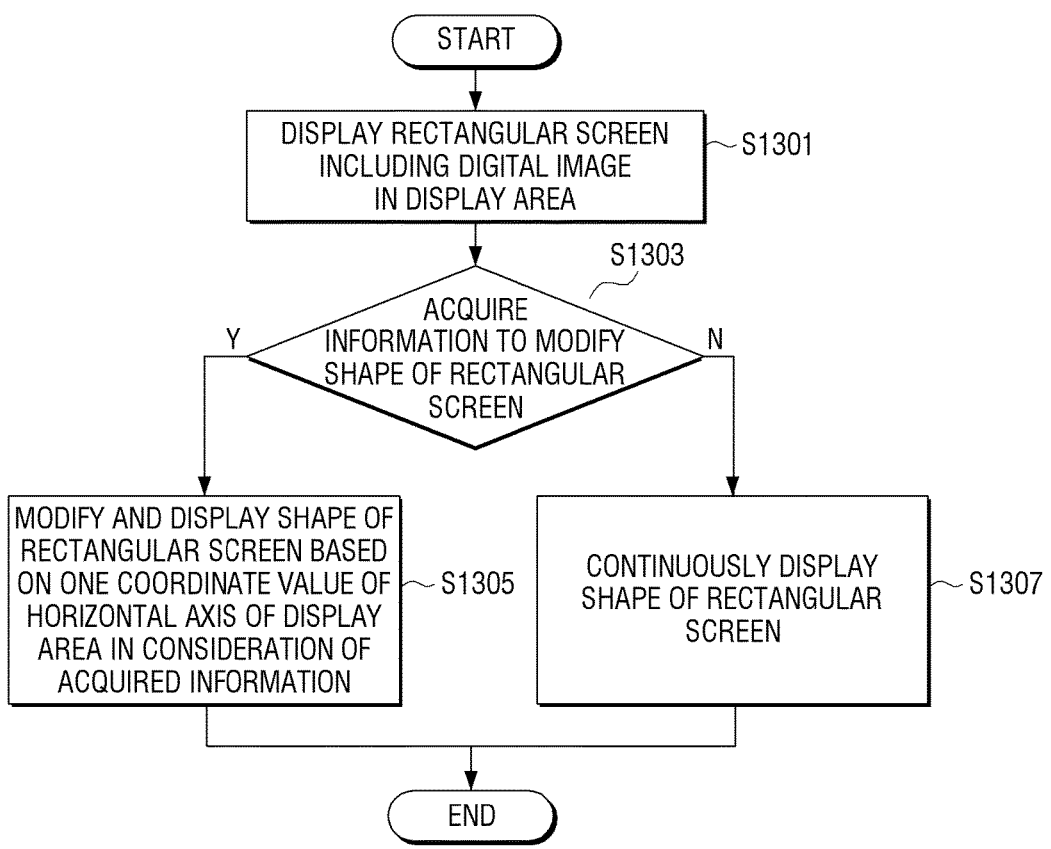
FIG. 13 is a flowchart illustrating a method of controlling a screen of a display apparatus according to an exemplary embodiment.

FIG. 13 is a flowchart illustrating a method of controlling a screen of the display apparatus 100 according to an exemplary embodiment.

In operation S1301, the display apparatus 100 displays a rectangular screen including a digital image in a display area.

In operation S1303, the display apparatus 100 determines whether information to modify a shape of the rectangular screen is acquired or received. When the information to modify the shape of the rectangular screen is determined to be acquired, the display apparatus 100 continues in operation S1305. Otherwise, the display apparatus 100 continues in operation S1307.

In operation S1305, the display apparatus 100 modifies and displays the shape of the rectangular screen based on one coordinate value of a horizontal axis of the display area in consideration of the acquired information. For example, as a height of the modified screen is closer to the one coordinate value, the height of the modified screen may decrease. As the digital image is closer to the one coordinate value, to correspond to the height of the modified screen, the digital image may shrink.

In operation S1307, the display apparatus 100 continuously displays the shape of the rectangular screen in the display area.

Figure 14:
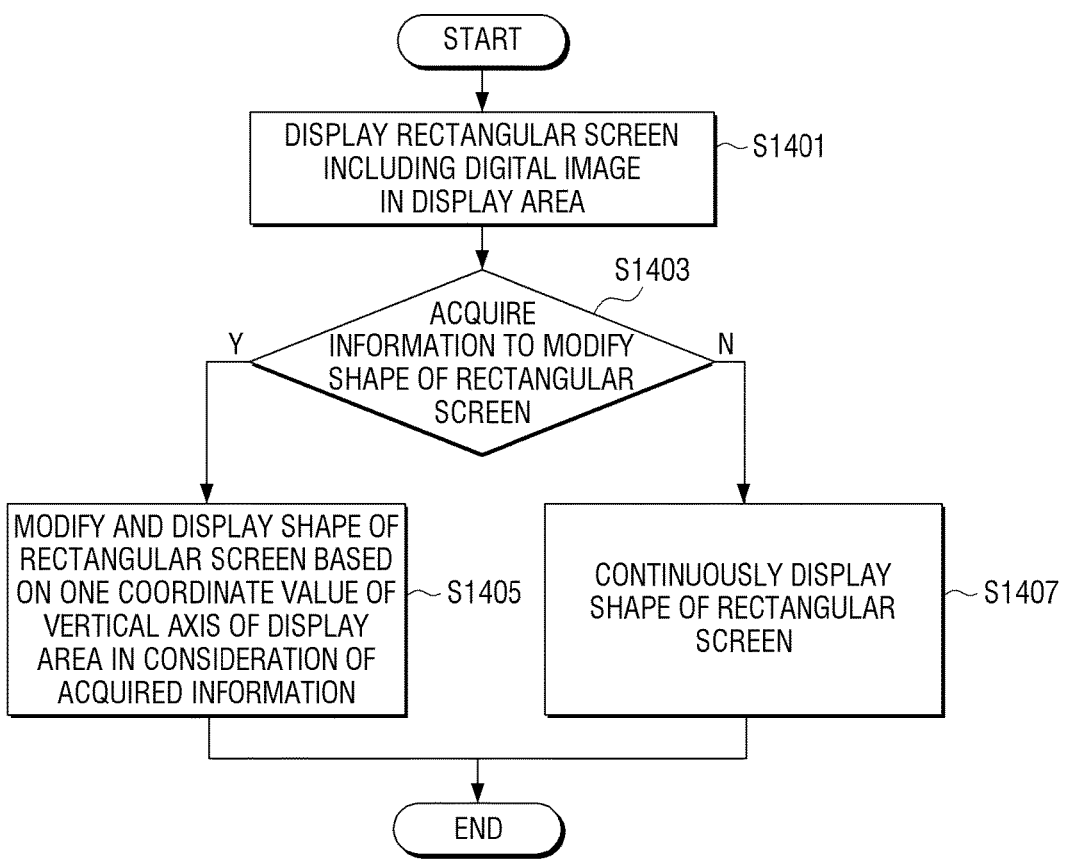
FIG. 14 is a flowchart illustrating a method of controlling a screen of a display apparatus according to another exemplary embodiment.

FIG. 14 is a flowchart illustrating a method of controlling a screen of the display apparatus 100 according to another exemplary embodiment.

In operation S1401, the display apparatus 100 displays a rectangular screen including a digital image in a display area.

In operation S1403, the display apparatus 100 determines whether information to modify a shape of the rectangular screen is acquired or received. When the information to modify the shape of the rectangular screen is determined to be acquired, the display apparatus 100 continues in operation S1405. Otherwise, the display apparatus 100 continues in operation S1407.

In operation S1405, the display apparatus 100 modifies and displays the shape of the rectangular screen based on one coordinate value of a vertical axis of the display area in consideration of the acquired information. For example, as a width of the modified screen is closer to the one coordinate value, the width of the modified screen may widen or narrow. As the digital image is closer to the one coordinate value, to correspond to the width of the modified screen, the digital image may enlarge or shrink.

In operation S1407, the display apparatus 100 continuously displays the shape of the rectangular screen in the display area.

Figure 15:
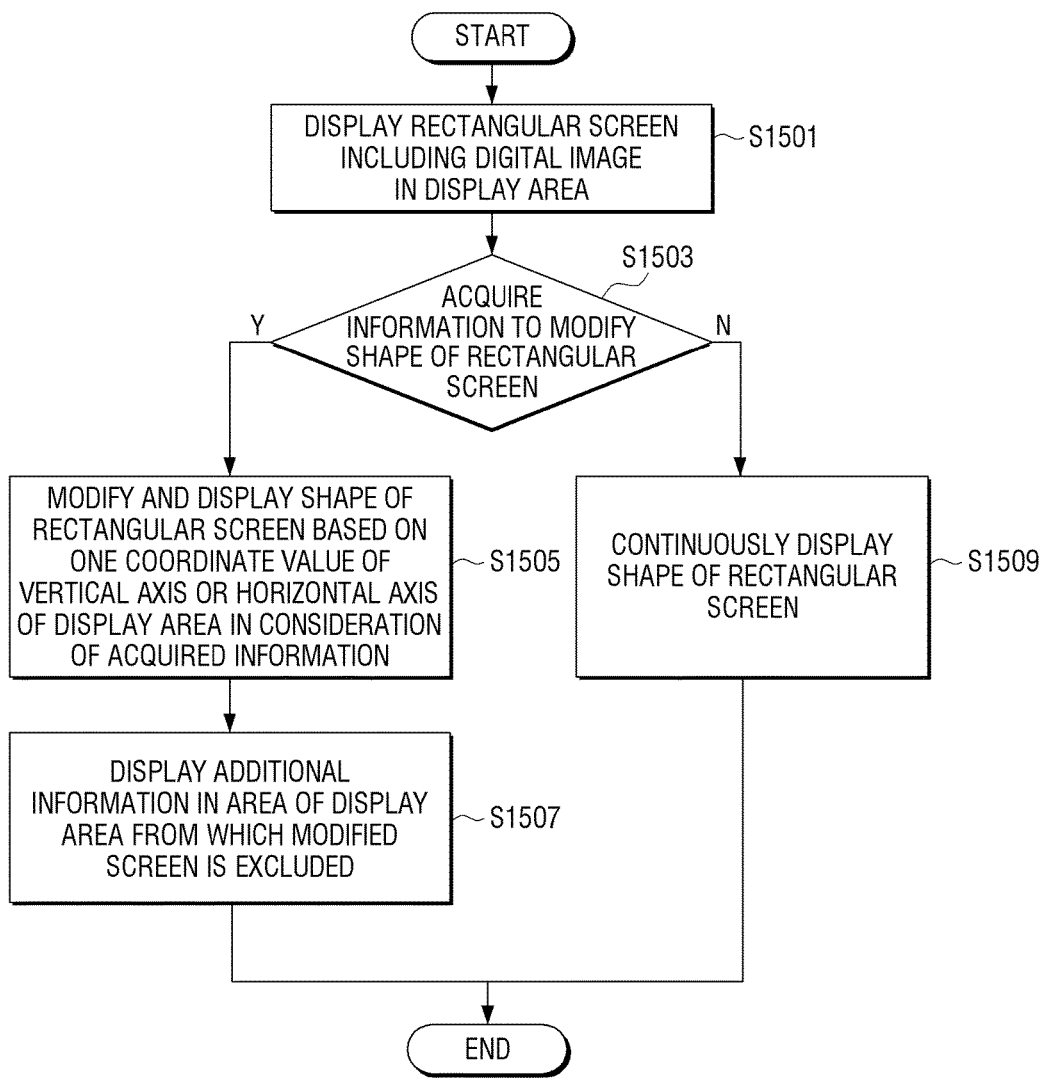
FIG. 15 is a flowchart illustrating a method of controlling a screen of a display apparatus according to another exemplary embodiment.

FIG. 15 is a flowchart illustrating a method of controlling a screen of the display apparatus 100 according to another exemplary embodiment.

In operation S1501, the display apparatus 100 displays a rectangular screen including a digital image in a display area.

In operation S1503, the display apparatus 100 determines whether information to modify a shape of the rectangular screen is acquired or received. When the information to modify the shape of the rectangular screen is determined to be acquired, the display apparatus 100 continues in operation S1505. Otherwise, the display apparatus 100 continues in operation S1509.

In operation S1505, the display apparatus 100 modifies and displays the shape of the rectangular screen based on one coordinate value of a vertical axis or a horizontal axis of the display area in consideration of the acquired information.

In operation S1507, the display apparatus 100 displays additional information in an area of the display area from which the modified screen is excluded. In this case, operation S1507 may be performed after operation S1505, operation S1505 may be performed after operation S1507, and operations S1507 and S1505 may be simultaneously performed.

In operation S1509, the display apparatus 100 continuously displays the shape of the rectangular screen.

Figure 16:
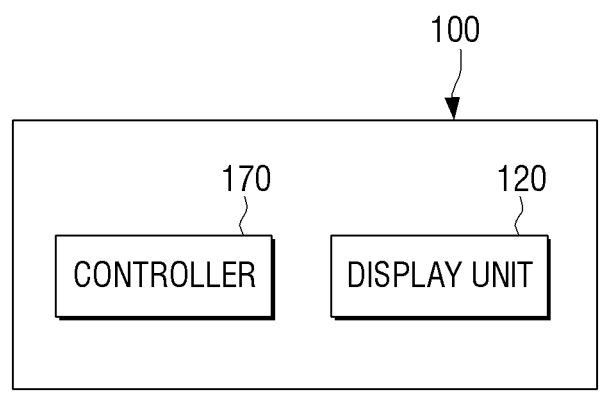
FIG. 16 is a block diagram illustrating a structure of a display apparatus according to another exemplary embodiment.

FIG. 16 is a block diagram simply illustrating a structure of the display apparatus 100 according to another exemplary embodiment.

Referring to FIG. 16, the display apparatus 100 includes the display unit 120 and the controller 170. The display unit 120 and the controller 170 are as described in the previous exemplary embodiment of FIG. 1, and thus their repeated descriptions are omitted.

The display unit 120 displays a rectangular screen including a digital image in a display area.

When the rectangular screen including the digital image is displayed, the controller 170 controls the display unit 120 or the display apparatus 100 to acquire information to modify a shape of the rectangular screen, and to modify and display the shape of the rectangular screen based on one coordinate value of a horizontal axis or a vertical axis of the display area in consideration of the acquired information. For example, if the controller 170 controls the display unit 120 to modify and display the shape of the rectangular screen based on one coordinate value of the horizontal axis of the display area, a height of the modified screen decreases as the height is closer to the one coordinate value, and the digital image may shrink as the digital image is closer to the one coordinate value to correspond to the height of the modified screen.

Referring to FIG. 1, when a first image is displayed on a plurality of display apparatuses, the user input unit 130 may receive a signal for changing a part of the first image, which is displayed on one of the plurality of display apparatuses, into a second image.

The controller 170 may respond to an input signal to display the second image on the one of the display apparatuses, divide the first image into the same number as a number of the plurality of display apparatuses of one group that excludes the one of the display apparatuses, and display the first image on the plurality of display apparatuses of the one group.

According to various exemplary embodiments as described above, a user may be provided with a digital image having an increased 3D effect through a modified screen. The modified screen having various shapes may be provided in consideration of a position of the user who views the digital image and/or a type of the digital image.

If an area of a display area from which the modified screen is excluded, has a transparent or dark color, the 3D effect of the digital image felt by the user may further increase.

Also, if additional information, such as widgets and the like, is provided in the area of the display from which the modified screen is excluded, a usability of the user who uses a display apparatus may be further diversified.

Also, a method of controlling a screen of a display apparatus according to the above-described various exemplary embodiments may be embodied as a program to be provided to the display apparatus. In detail, there may be provided a non-transitory computer readable medium that stores the program including the method of controlling the screen of the display apparatus.

The non-transitory computer readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like. Also, programs as described above may be stored and provided on the storage unit 150 of the display apparatus 100 as an example of the non-transitory computer readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a screen of a display apparatus, the method comprising:
    displaying a screen having a rectangular shape in a display area of the display apparatus, the displayed screen including a digital image;
    acquiring information for changing a shape of the displayed screen from the rectangular shape to a curved shape; and
    based on the acquired information, changing the shape of the displayed screen from the rectangular shape to the curved shape, the curved shape having a horizontal side that is concave toward a center of the display area,
    wherein a curvature of the horizontal side is identified based on the acquired information.

2. The method of claim 1, wherein the information for changing the shape of the displayed screen comprises a position of a user who views the digital image.

3. The method of claim 1, wherein:
    the information for changing the shape of the displayed screen comprises a vertical distance between the display apparatus and a user; and
    a curvature of the curve shape decreases with an increase in the vertical distance.

4. The method of claim 1, wherein:
    the information for changing the shape of the displayed screen comprises a horizontal distance between a point of the display apparatus and a user; and
    in response to the horizontal distance being greater than or equal to a preset distance, a horizontal side of the changed screen has a slashed shape.

5. The method of claim 1, wherein the information for changing the shape of the displayed screen comprises at least one of a type of a content in the digital image, a motion of a user who views the digital image, a height of the user, and information of a manipulation of a remote controller connected to the display apparatus.

6. The method of claim 1, further comprising:
    displaying additional information in an area of the display area from which the changed screen is excluded.

7. The method of claim 1, further comprising:
    displaying, in a dark color, an area of the display area from which the changed screen is excluded.

8. The method of claim 1, further comprising:
    displaying an external environment image of the display apparatus that corresponds to an area of the display area from which the changed screen is excluded, in the area of the display area from which the changed screen is excluded.

9. A method of controlling a screen of a display apparatus, the method comprising:
    displaying a screen having a rectangular shape in a display area of the display apparatus, the displayed screen including a digital image;
    acquiring information for changing a shape of the displayed screen from the rectangular shape to a curved shape; and
    based on the acquired information, changing the shape of the displayed screen from the rectangular shape to the curved shape, the curved shape having a horizontal side that is convex toward a center of the display area,
    wherein a curvature of the horizontal side is identified based on the acquired information.

10. A display apparatus for controlling a screen, the display apparatus comprising:
    a display unit configured to display a screen having a rectangular shape in a display area of the display apparatus, the displayed screen comprising a digital image; and
    a controller configured to:
        acquire information for changing a shape of the displayed screen from the rectangular shape to a curved shape, and
        based on the acquired information, control the display unit to change the shape of the displayed screen from the rectangular shape to the curved shape, the curved shape having a horizontal side that is concave toward a center of the display area,
    wherein a curvature of the horizontal side is identified based on the acquired information.

11. The display apparatus of claim 10, wherein the information for changing the shape of the displayed screen comprises a position of a user who views the digital image.

12. The display apparatus of claim 10, wherein:
    the information for changing the shape of the displayed screen comprises a vertical distance between the display apparatus and a user;
    a horizontal side of the changed screen has a curve shape that is concave toward a center of the display area; and
    a curvature of the curve shape decreases with an increase in the vertical distance.

13. The display apparatus of claim 11, wherein:
    the information for changing the shape of the displayed screen comprises a horizontal distance between a point of the display apparatus and the user; and
    in response to the horizontal distance being greater than or equal to a preset distance, a horizontal side of the changed screen has a slashed shape.

14. The display apparatus of claim 10, wherein the information for changing the shape of the displayed screen comprises at least one of a type of a content in the digital image, a motion of a user who views the digital image, a height of the user, and information of a manipulation of a remote controller connected to the display apparatus.

15. The display apparatus of claim 10, wherein the controller is further configured to:
    control the display unit to display additional information in an area of the display area from which the changed screen is excluded.

16. The display apparatus of claim 10, wherein the controller is further configured to:
    control the display unit to display, in a dark color, an area of the display area from which the changed screen is excluded.

17. The display apparatus of claim 10, wherein the controller is further configured to:

control the display unit to display an external environment image of the display apparatus that corresponds to an area of the display area from which the changed screen is excluded, in the area of the display area from which the changed screen is excluded.

18. A display apparatus for controlling a screen, the display apparatus comprising:
a display unit configured to display a screen having a rectangular shape in a display area of the display apparatus, the displayed screen comprising a digital image; and
a controller configured to:
acquire information for changing a shape of the displayed screen from the rectangular shape to a curved shape, and
based on the acquired information, control the display unit to change the shape of the displayed screen from the rectangular shape to the curved shape, the curved shape having a horizontal side that is convex toward a center of the display area,
wherein a curvature of the horizontal side is identified based on the acquired information.

19. The method of claim 1, wherein the information for changing the shape of the displayed screen includes at least one of a position of a user who views the digital image, a vertical distance between the display apparatus and a user, a horizontal distance between a point of the display apparatus and the user, a type of a content in the digital image, a motion of a user who views the digital image, a height of the user, or information of a manipulation of a remote controller connected to the display apparatus.

* * * * *